(12) United States Patent  
Sakai

(10) Patent No.: US 8,196,146 B2  
(45) Date of Patent: Jun. 5, 2012

(54) INFORMATION PROCESSING APPARATUS, PARALLEL PROCESSING OPTIMIZATION METHOD, AND PROGRAM

(75) Inventor: Ryuji Sakai, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 943 days.

(21) Appl. No.: 12/202,677

(22) Filed: Sep. 2, 2008

(65) Prior Publication Data

US 2009/0083751 A1   Mar. 26, 2009

(30) Foreign Application Priority Data

Sep. 25, 2007   (JP) .................................. 2007-248025

(51) Int. Cl.  
G06F 9/46 (2006.01)

(52) U.S. Cl. ........................................ 718/106; 717/149

(58) Field of Classification Search .......................... None  
See application file for complete search history.

(56) References Cited

U.S. PATENT DOCUMENTS

| | | | | |
|---|---|---|---|---|
| 5,048,018 | A * | 9/1991 | Bernstein et al. ............. | 717/131 |
| 5,524,242 | A * | 6/1996 | Aida et al. .................... | 717/149 |
| 5,586,320 | A * | 12/1996 | Hotta et al. ................... | 718/106 |
| 5,832,272 | A * | 11/1998 | Kalantery ..................... | 717/149 |
| 6,341,371 | B1 * | 1/2002 | Tandri ........................... | 717/158 |
| 7,082,601 | B2 | 7/2006 | Ohsawa et al. ............... | 717/149 |
| 7,707,390 | B2 * | 4/2010 | Ozer et al. .................... | 712/214 |
| 7,730,288 | B2 * | 6/2010 | Luick ............................ | 712/225 |
| 7,984,431 | B2 * | 7/2011 | Kejariwal et al. ............. | 717/151 |
| 2002/0174164 | A1 * | 11/2002 | Hayashi ........................ | 709/102 |

FOREIGN PATENT DOCUMENTS

| | | |
|---|---|---|
| JP | 08-055092 | 2/1996 |
| JP | 2005-258920 | 9/2005 |

* cited by examiner

*Primary Examiner* — Eric Coleman  
(74) *Attorney, Agent, or Firm* — Pillsbury Winthrop Shaw Pittman, LLP

(57) ABSTRACT

An information processing apparatus includes a plurality of execution units and a scheduler which controls assignment of a plurality of basic modules of a program to the plurality of execution units. The scheduler detects a parallel degree representing a parallelization ratio in parallel processing of a program by the plurality of execution units, and detects a load associated with control of assigning the plurality of basic modules in the parallel processing of the program by the plurality of execution units. And then, the scheduler combines two or more basic modules which are successively executed according to a paralleled execution description in order to assign two or more basic modules as a module to a single execution unit, when a value of the parallel degree exceeds a predetermined value and a value of the load exceeds a predetermined value.

9 Claims, 6 Drawing Sheets

- Link open order

- Urgency in executing current node

- Parallel execution margin in executing current node

INFORMATION PROCESSING APPARATUS, PARALLEL PROCESSING OPTIMIZATION METHOD, AND PROGRAM

CROSS-REFERENCE TO RELATED APPLICATIONS

This application is based upon and claims the benefit of priority from Japanese Patent Application No. 2007-248025, filed Sep. 25, 2007, the entire contents of which are incorporated herein by reference.

BACKGROUND

1. Field

One embodiment of the invention relates to a program parallel processing technique suitable for, e.g., a computer that mounts a CPU including a plurality of CPU cores or a computer that mounts a plurality of CPUs.

2. Description of the Related Art

In recent years, various types of computers (personal computers) for private use, such as notebook type computers and desktop type computers have prevailed. For such computers, demands for information processing capability have been increasing to close to the limits of CPU performance improvement. For example, there is a demand for playing back high resolution moving image data by software.

To meet such demand, for example, computers which mount a plurality of CPUs, and recently, a CPU including a plurality of CPU cores, have become available. These computers shorten the turnaround time and improve the performance by processing programs in parallel. Various mechanisms for efficiently processing programs in parallel have been proposed (see, e.g., Jpn. Pat. Appln. KOKAI Publication No. 2005-258920).

One parallel processing technique of a program comprises two components, i.e., runtime processing including a scheduler, which assigns processing units in the program to execution units (when a computer mounts a plurality of CPUs, the scheduler assigns the processing units to the CPUs, and when a computer mounts a CPU including a plurality of CPU cores, the scheduler assigns the processing units to the CPU cores), and a processing unit processed on each execution unit. Note that the size of a processing unit is referred to as the granularity of parallel processing. It is possible to increase the opportunities for parallelization by decreasing the granularity, thereby improving the parallel performance.

On the other hand, if the granularity of parallel processing is too small, the number of operations of the scheduler is large. It is therefore impossible to obtain adequate performance due to too the high overhead.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes a plurality of execution units and a scheduler which controls assignment of a plurality of basic modules of a program to the plurality of execution units. The scheduler detects a parallel degree representing a parallelization ratio in parallel processing of a program by the plurality of execution units, and detects a load associated with control of assigning the plurality of basic modules in the parallel processing of the program by the plurality of execution units. And then, the scheduler combines two or more basic modules which are successively executed according to a paralleled execution description in order to assign two or more basic modules as a module to a single execution unit, when a value of the parallel degree exceeds a predetermined value and a value of the load exceeds a predetermined value.

Figure 1:
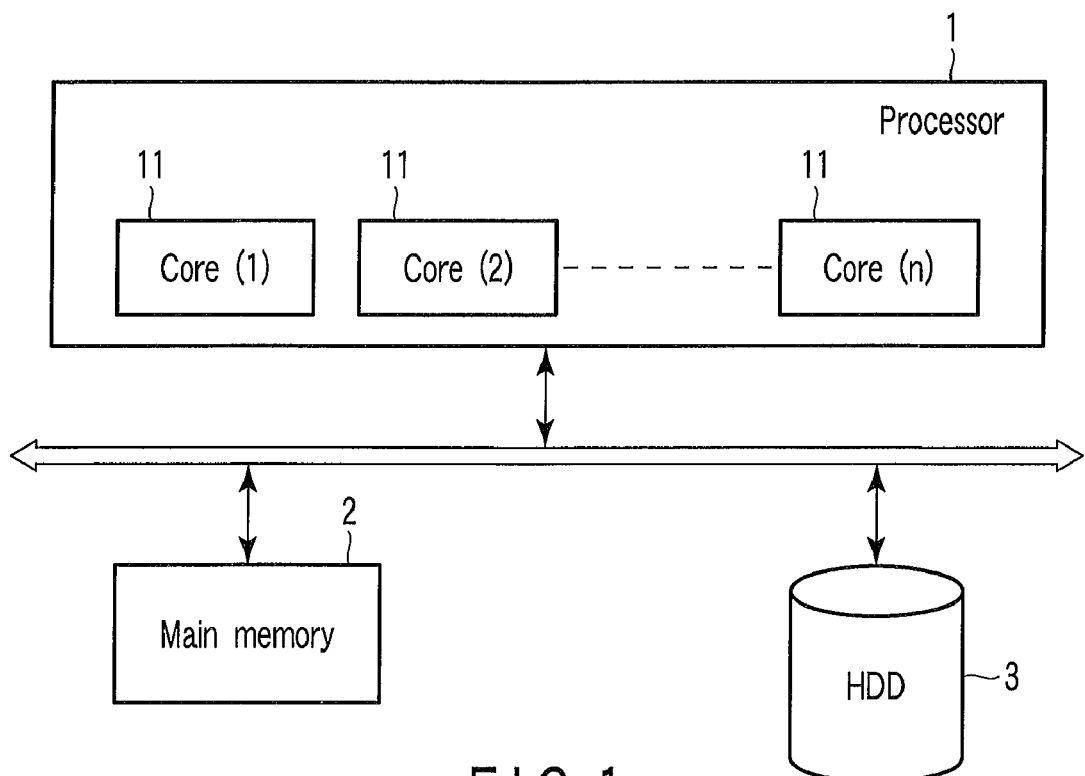
FIG. 1 is an exemplary view showing a system configuration of an information processing apparatus according to an embodiment of the invention.

FIG. 1 is an exemplary view showing a system configuration of an information processing apparatus according to the embodiment. The information processing apparatus is implemented as a so-called personal computer such as a notebook type computer or desktop type computer. As shown in FIG. 1, this computer includes a processor 1, main memory 2, and hard disk drive (HDD) 3, which are interconnected via an internal bus.

The processor 1 serves as a central processing unit (CPU) which controls the execution of a program loaded in the main memory 2 from the HDD 3, and includes a plurality of cores 11 serving as main arithmetic circuits (CPU cores).

The main memory 2 is, e.g., a semiconductor storage device, and can be accessed by the processor 1. The HDD 3 is a low-speed mass storage device (in comparison with the main memory 2) serving as an auxiliary storage in the computer.

Although not shown in FIG. 1, input/output devices such as a display for displaying the processing result of the program executed by the processor 1 and the like, and a keyboard for inputting process data and the like are provided for, e.g., a notebook type computer, or are externally connected via cables for, e.g., a desktop type computer.

The computer which mounts the processor 1 including the plurality of cores 11 can execute a plurality of programs in parallel, and also execute a plurality of processes in one program in parallel. The schematic configuration of a program, based on parallel processing specifications, which is executed by the computer will be described with reference to FIG. 2.

Figure 2:
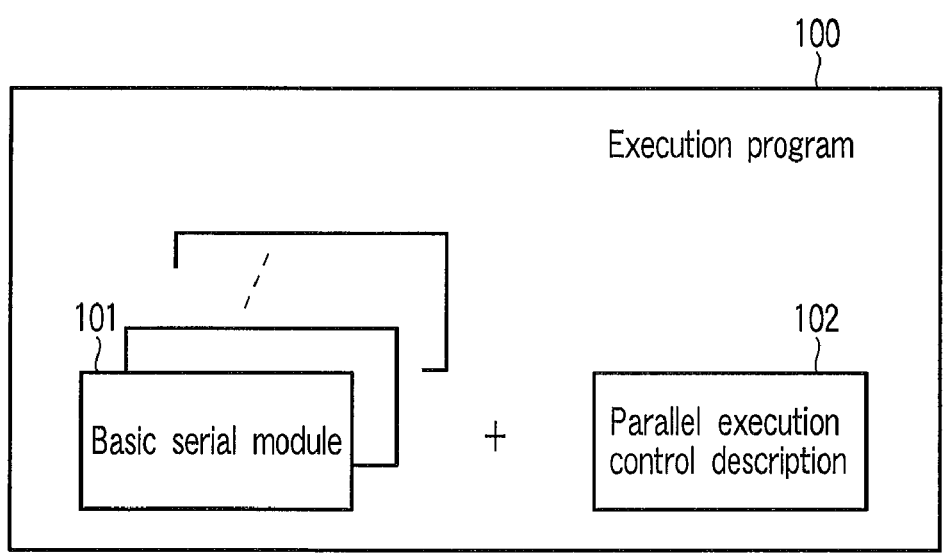
FIG. 2 is an exemplary view for explaining the schematic configuration of a program based on parallel processing specifications, which is executed by the information processing apparatus according to the embodiment.

As shown in FIG. 2, an execution program 100 based on parallel processing specifications, which is executed by the computer includes a plurality of basic serial modules 101, and a parallel execution control description 102 which defines an order of executing the plurality of basic serial modules 101.

Figure 3:
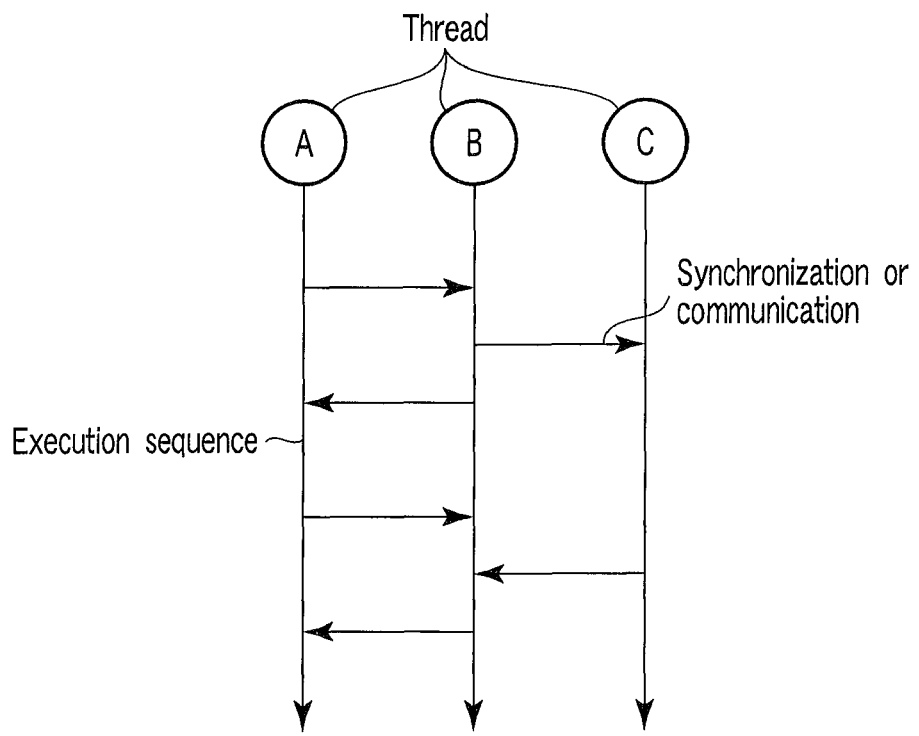
FIG. 3 is an exemplary view showing general multi thread processing.

In so-called multi-thread processing, as shown in FIG. 3, each thread progresses while synchronizing with other threads (including communication), i.e., maintaining consistency of the program as a whole. If the frequency of waiting for synchronization is high, it may be impossible to obtain the parallel performance expected.

Figure 4:
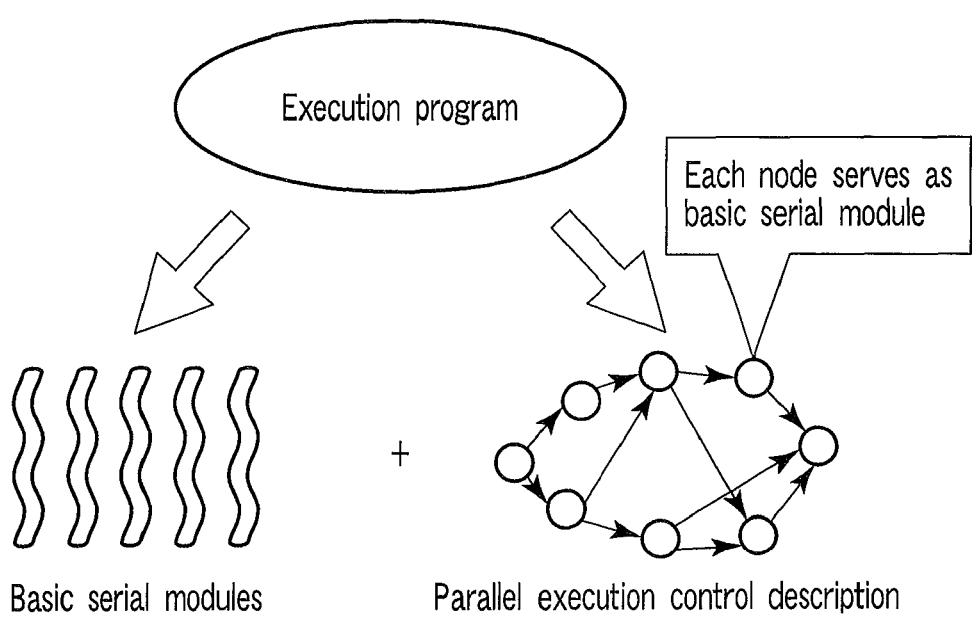
FIG. 4 is an exemplary view showing the relationship between basic serial modules and a parallel execution control description which are included in the program executed by the information processing apparatus according to the embodiment.

In this embodiment, as shown in FIG. 4, by dividing a program into processing units which need not synchronize with other modules and thus can be asynchronously executed, a plurality of basic serial modules 101 are created while a parallel execution control description 102 which defines a paralleled execution description for the plurality of basic serial modules 101 is created. Under the parallel execution control, each of the basic serial modules 101 is represented as a node. As explained above, a basic serial module indicates a module as a processing unit which can be executed asynchronously with other modules. The parallel execution control description 102 will be described next with reference to FIG. 5.

Figure 5:
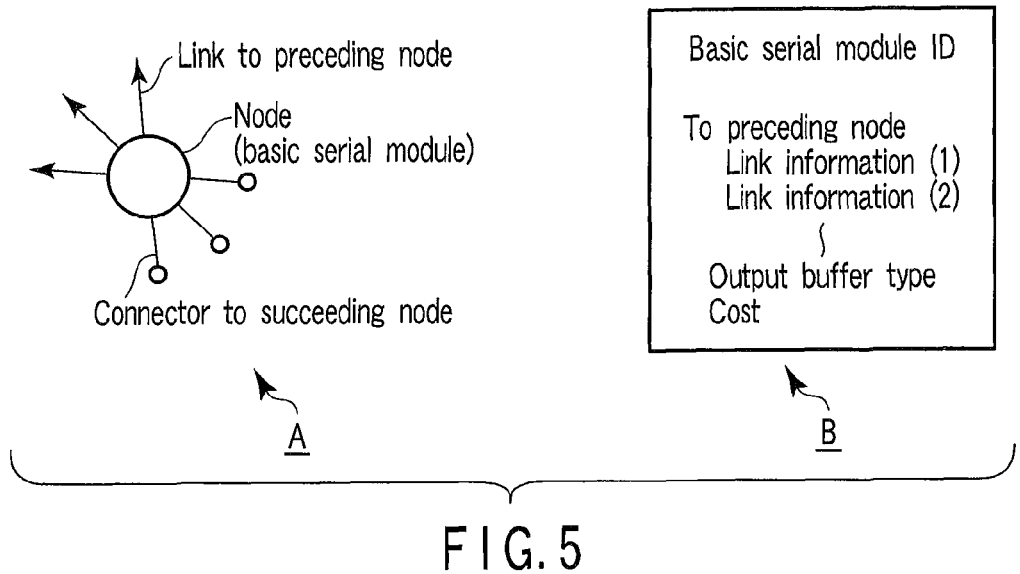
FIG. 5 is an exemplary view for explaining the parallel execution control description of the program executed by the information processing apparatus according to the embodiment.

"A" in FIG. 5 denotes a schematic node representing one of the basic serial modules 101. As shown in FIG. 5, each of the basic serial modules 101 can be considered as a node having links to preceding nodes and connectors to succeeding nodes. The parallel execution control description 102 defines an order of executing the plurality of basic serial modules 101 by describing link information on preceding nodes with respect to each of the basic serial modules 101. "B" in FIG. 5 denotes a parallel execution control description associated with one of the basic serial modules 101. As shown in FIG. 5, the description describes a basic serial module ID serving as the identifier of the basic serial module 101, and link information on the preceding nodes of the basic serial module 101. Also, the description describes information on an output buffer type, cost, and the like.

A method by which the computer executes the execution program 100 having a unique configuration in that a plurality of basic serial modules 101 and a parallel execution control description 102 are included will now be described.

Figure 6:
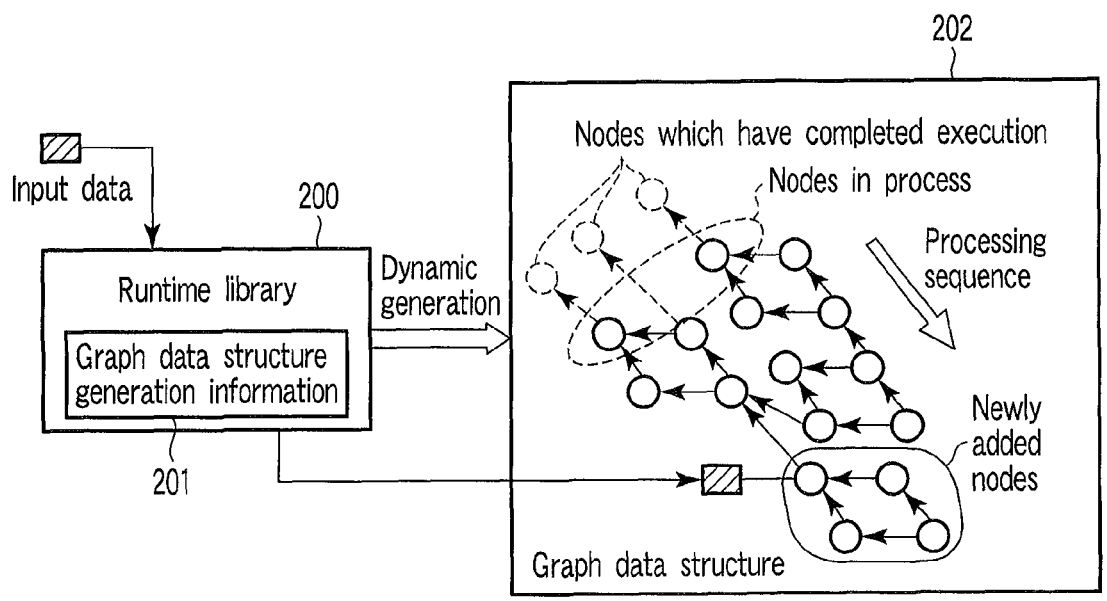
FIG. 6 is an exemplary view for explaining the parallel processing control of the program, which is executed by a runtime library operating on the information processing apparatus according to the embodiment.

To execute, in parallel, the execution program 100 having such unique configuration, a runtime library 200 shown in FIG. 6 is prepared in the computer. The runtime library 200 has a scheduler function, and is provided with the parallel execution control description 102 as graph data structure generation information 201. The parallel execution control description 102 is created by, e.g., using a functional programming language, and translated into the graph data structure generation information 201 by a translator.

When data is input, there is a need for executing some of the basic serial modules 101 for processing the data. Each time the need arises, the runtime library 200 dynamically generates/updates a graph data structure 202 on the basis of the graph data structure generation information 201. The graph data structure 202 is graph data representing the relationship between preceding and succeeding nodes to be executed as needed. The runtime library 200 adds the nodes to the graph data structure 202 in consideration of the relationship between preceding and succeeding nodes in an execution waiting state as well as the relationship between the preceding and succeeding nodes to be added.

Upon completion of the execution of a node, the runtime library 200 deletes the node from the graph data structure 202, sets the node to a preceding node, and checks whether other preceding nodes exist or checks the presence/absence of a succeeding node for which all other preceding nodes have been completed. If there exists a succeeding node which satisfies the condition, the runtime library 200 assigns the node to one of the cores 11.

Figure 7:
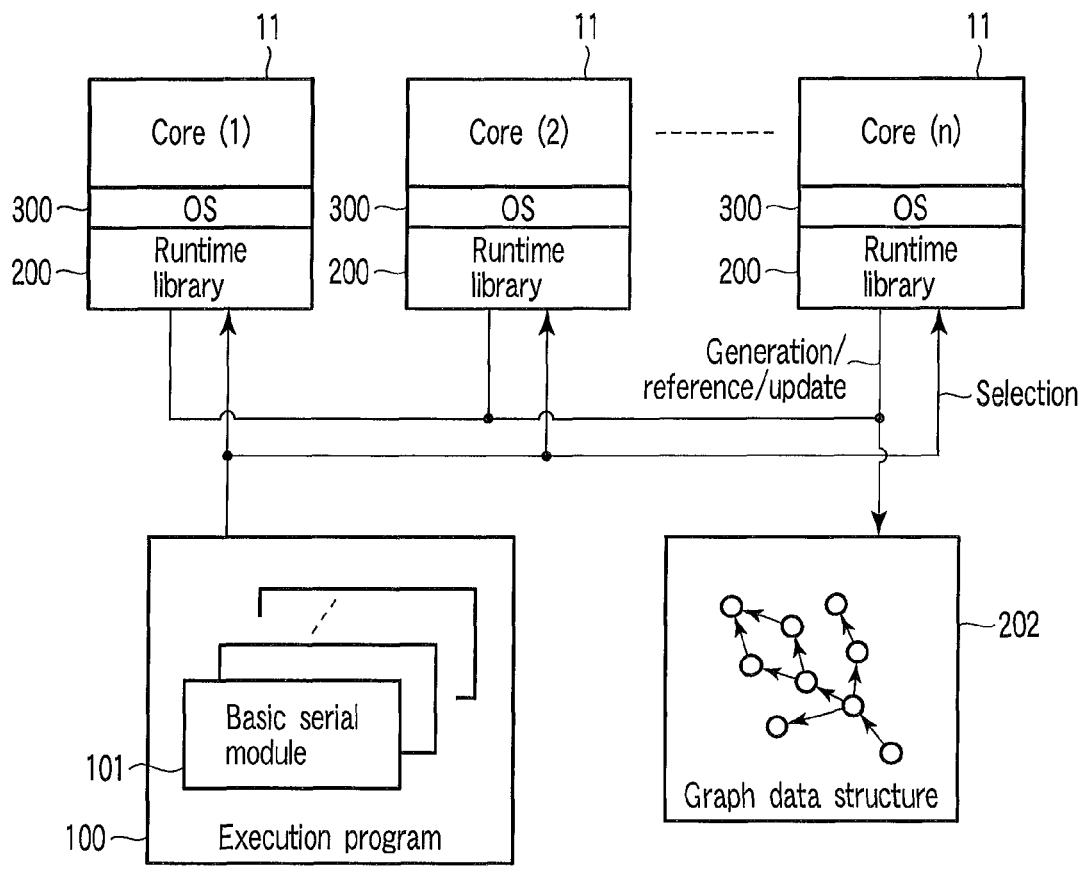
FIG. 7 is an exemplary view showing the operation state of the runtime libraries on the information processing apparatus according to the embodiment.

With this operation of the runtime library 200, the parallel execution of the plurality of basic serial modules 101 progresses on the basis of the parallel execution control description 102 without contradiction. The runtime library 200 executes the processing by using a higher number of threads than cores 11 built into the processor 1 (multi-thread). As a result, as shown in FIG. 7, it is possible to operate the computer as if each core 11 (the runtime library 200 as a thread under the control of an OS 300 of the corresponding core 11) had autonomously found one basic serial module 101 to be executed next. Exclusive control between the threads is executed only for the runtime library 200 to select a node from the graph data structure 202 and update the graph data structure 202. Therefore, in comparison with the general multi-thread processing shown in FIG. 3, the processing according to the embodiment achieves a higher parallel performance.

If the processing unit of the basic serial modules 101, i.e., the granularity of parallel processing is too small with respect to the number of the cores 11 built into the processor 1 of the computer, the operation opportunity of the runtime library 200, i.e., a so-called overhead increases, and therefore the execution efficiency may decrease. In consideration of this, the runtime library 200 of this embodiment further includes a function of adaptively optimizing the granularity of parallel processing.

Figure 8:
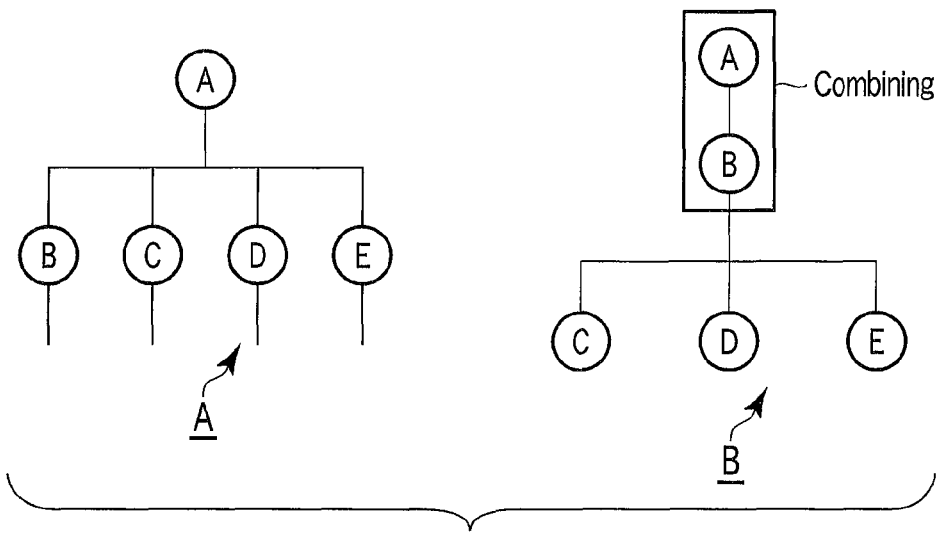
FIG. 8 is an exemplary view for explaining a node combining processing executed by the runtime library operating on the information processing apparatus according to the embodiment.

More specifically, assume that there exist five nodes, i.e., node A to node E having the relationship denoted by "A" in FIG. 8. The runtime library 200 includes a function of combining node A and node B, and changing the preceding node of node C to node E from node A to node B, as denoted by "B" in FIG. 8. To make it possible to dynamically and efficiently execute the combining processing, the runtime library 200 holds information shown in FIG. 9 for each piece of link information to preceding nodes of each node.

A field "link open order" records, for a node generated based on the graph data structure generation information 201, an order in which nodes linked according to the link information of the generated node complete execution. In executing the basic serial module 101 corresponding to a node, a field "urgency in executing the current node" records the number of nodes, in a state which has advanced from the start of execution, of other nodes to which a node whose link open order represents the last number with respect to the node being executed is linked (references). The smaller the value, the higher the urgency. That is, when the number of nodes in a state which advances from the start of execution is zero, the urgency is the highest. A field "parallel execution margin in executing the current node" records the number of nodes in an executable state in executing the current node. All three of these pieces of information may change upon execution of each unit. As for the first two fields, therefore, all possible values are prepared and are counted up. As for the parallel execution margin, data is compressed and recorded by using, e.g., the average value of the last N parallel execution margins or an expected margin (e.g., a preceding value×$(1-\alpha)$+a current value×$\alpha$).

Figures 9, 10:
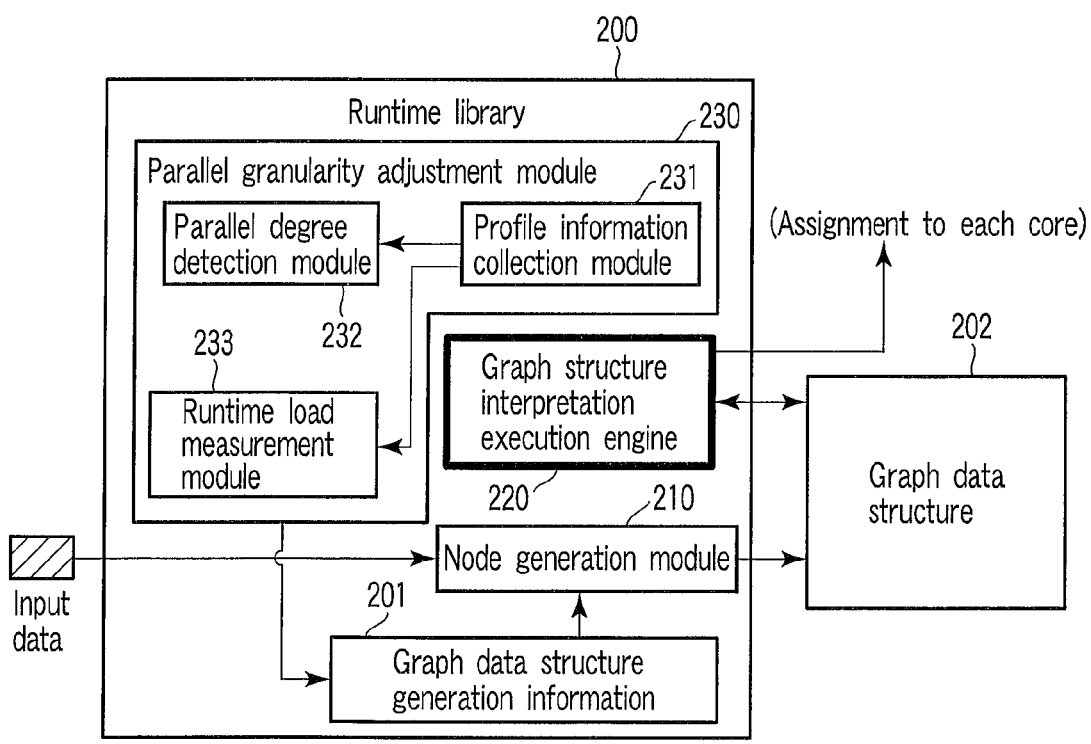
FIG. 9 is an exemplary view showing information held for the runtime library operating on the information processing apparatus according to the embodiment to execute the node combining processing.
FIG. 10 is an exemplary functional block diagram of the runtime library operating on the information processing apparatus according to the embodiment.

FIG. 10 is an exemplary functional block diagram showing the runtime library 200.

As shown in FIG. 10, the runtime library 200 has a node generation module 210, graph structure interpretation execution engine 220, and parallel granularity adjustment module 230.

The node generation module 210 and graph structure interpretation execution engine 220 implement the above described dynamic generation/update of the graph data structure 202 on the basis of the graph data structure generation information 201 and the above described control of assigning nodes to the cores 11 using the graph data structure 202, both of which are executed by the runtime library 200. The parallel granularity adjustment module 230 implements the adaptive optimization of the granularity of parallel processing, to be described in detail below. The parallel granularity adjustment module 230 has a profile information collection module 231, parallel degree detection module 232, and runtime load measurement module 233.

When the runtime library 200 runs upon completion of the execution of each of the basic serial modules 101, the profile information collection module 231 collects information on "link open order", "urgency", and "parallel execution margin" of the link information of a node corresponding to this basic serial module 101.

The parallel degree detection module 232 measures the parallelization ratio in the parallel processing of the execution program 100 by the processor 1. The parallel degree detection module 232 calculates a value representing the parallelization ratio by dividing the total execution time of the basic serial modules 101 at all the cores 11 by an actual elapsed time.

The runtime load measurement module 233 measures the processing load (the overhead) of the runtime library 200, which is related with the parallel processing of the execution program 100 by the processor 1. The module 233 can measure the load by measuring, before and after the runtime library runs, the value in a register recording the execution clock cycle of each of the cores 11. Since the number of executable nodes is zero, i.e., the basic serial module 101 to be executed next does not exist, assume that the processing load time does not include a waiting time.

The parallel granularity adjustment module 230 executes the adaptive optimization of the granularity of parallel processing by using various pieces of information obtained by the profile information collection module 231, parallel degree detection module 232, and runtime load measurement module 233, as will be described below.

That is, if the processing load of the runtime library 200 per unit time is larger than unit execution time×(the number of cores−parallel degree)×$\alpha$, the parallel granularity adjustment module 230 determines that the processing load may have become a performance bottleneck. Let $\alpha$ be a predetermined threshold.

When determining that the processing load of the runtime library 200 may have become a performance bottleneck, the parallel granularity adjustment module 230 combines nodes to decrease the processing load. More specifically, the parallel granularity adjustment module 230 first selects, from the pieces of link information of the graph data structure generation information 201, link information whose urgency is highest and whose parallel execution margin is largest. The parallel granularity adjustment module 230 combines a node including the selected link information and a linked reference node whose link open order represents the last number.

While executing the combining processing, the parallel granularity adjustment module 230 generates new graph data structure generation information 201 having as attribute information the nodes to be combined. The information to be newly generated is information on a node for successively executing two basic serial modules 101 on the same core 11, and its link information is obtained by merging the link information of the two nodes. That is, the node to be newly created corresponds to a logical basic serial module 101 which combines two basic serial modules 101 into one module.

At this time, the parallel granularity adjustment module 230 overwrites the link information of other nodes referencing the two nodes with the newly generated node. The node generation module 210 adds nodes to the graph data structure 202 using the newly generated graph data structure generation information 201 from then on.

Since the basic serial modules 101 corresponding to the combined node are successively executed on the same core 11, the parallel granularity adjustment module 230 executes optimization of compilers for scheduling instructions, reassigning variables to registers, and the like within a range of the combined node, and also executes transformation for efficiently processing those processes.

With this operation of the parallel granularity adjustment module 230, the runtime library 200 implements adaptive self adjustment of the granularity of parallel processing in executing the execution program 100.

Figure 11:
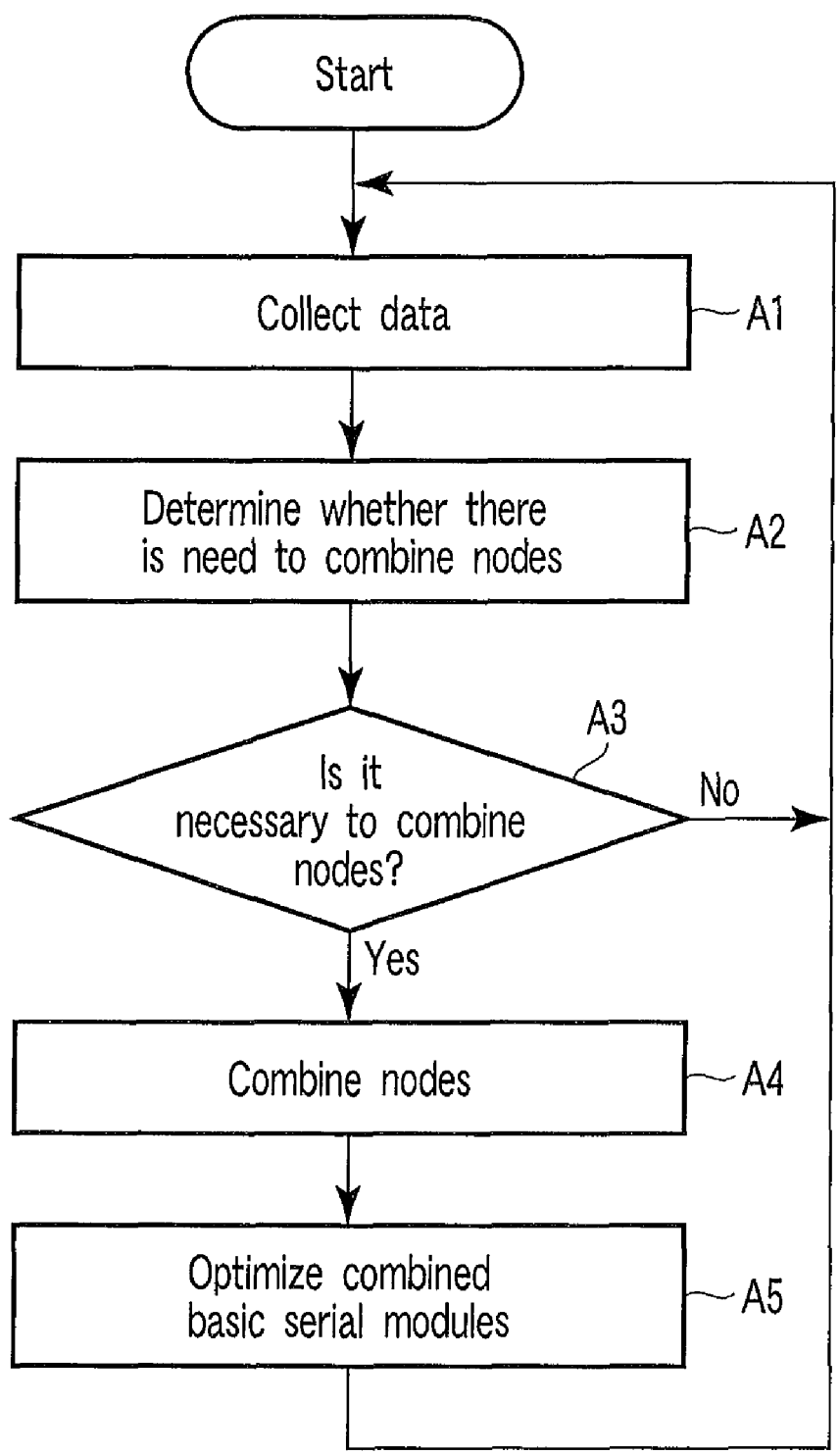
FIG. 11 is an exemplary flowchart showing the operation sequence of parallel processing optimization executed by the runtime library operating on the information processing apparatus according to the embodiment.

FIG. 11 is an exemplary flowchart showing the operation sequence of parallel processing optimization executed by the computer.

When the runtime library 200 runs, the parallel granularity adjustment module 230 of the runtime library 200 collects data using the profile information collection module 231, parallel degree detection module 232, and runtime load measurement module 233 (block A1).

The parallel granularity adjustment module 230 determines in accordance with the collected data whether there is a need to combine nodes (block A2). If the parallel granularity adjustment module 230 determines that there is a need to combine nodes (YES in block A3), it combines the nodes (block A4), and performs optimization of the two basic serial modules 101 to be successively executed in the same core 11 (block A5).

According to this method (in which the granularity of parallel processing is self-adjusted upon execution), the basic serial modules 101 are divided into sufficiently small processing units without considering the granularity in creating the execution program 100. It is therefore possible to omit the operation of adjusting or recreating the execution program 100 for each of the cores 11.

Although the method of decreasing the overhead (the process amount of the runtime library 200) when the basic serial modules 101 as sufficiently small units are executed in parallel has been explained, the parallel processing performance may decrease due to combining processing. For example, this situation may occur when the load balance for modules changes as the characteristics of input data to be processed change.

In consideration of this, the parallel granularity adjustment module 230 preferably saves information on two original nodes as attribute information on a combined node, and has a further function of returning the combined node to the two original nodes if necessary. In this case, it is possible to execute optimization processing in which some nodes are combined in an initial state, and when the granularity is not adequate and the overhead is small, the granularity is increased by dividing the combined node.

If a function of self-adjusting the granularity to be larger or smaller is provided, it is possible to dynamically cope with a case in which the usable situation of the cores 11 significantly changes.

Although the method in which the computer mounts the processor 1 including the plurality of cores 11 has been described by way of example in this embodiment, the method is also applicable to a so called multiprocessor computer mounting a plurality of processors 1.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus, comprising: a plurality of execution units; and
a scheduler configured to control assignment of a plurality of basic modules to the plurality of execution units based on a paralleled execution description for the plurality of basic modules in order to execute a program in parallel by the plurality of execution units, the program being divided into the plurality of basic modules executable asynchronously with another module and being defined the paralleled execution description,
the scheduler including:
a parallel degree detection module configured to detect a parallel degree representing a paralielization ratio in parallel processing of the program by the plurality of execution units;
a load detection module configured to detect a load associated with control of assigning the plurality of basic modules in the parallel processing of the program by the plurality of execution units; and
a module combination module configured to combine two or more basic modules which are successively executed according to the paralleled execution description in order to assign two or more basic modules as a module to a single execution unit, when a value of the parallel degree detected by the parallel degree detection module exceeds a predetermined value and a value of the load detected by the load detection module exceeds a predetermined value, the two or more basic modules being different from each other.

2. The information processing apparatus of claim 1, wherein the scheduler further includes a module division module configured to redivide the two or more basic modules combined by the module combination module.

3. The information processing apparatus of claim 1, wherein the module combination module of the scheduler reschedules, within a range of two or more basic modules to be combined, instructions contained in the two or more basic modules.

4. The information processing apparatus of claim 1, wherein the module combination module of the scheduler reassigns, within a range of two or more basic modules to be combined, variables contained in the two or more basic modules to registers.

5. The information processing apparatus of claim 1, wherein the parallel degree detection module of the scheduler calculates a parallel degree by dividing a total execution time of the plurality of basic modules in the plurality of execution units by an actual elapsed time.

6. The information processing apparatus of claim 1, wherein the plurality of execution units are CPU cores built into a CPU.

7. The information processing apparatus of claim 1, wherein the plurality of execution units are a plurality of CPUs each of which is individually formed.

8. A parallel processing optimization method for an information processing apparatus which executes a program in parallel by a plurality of execution units, the program being divided into a plurality of basic modules executable asynchronously with another module and being defined a paralleled execution description for the plurality of basic modules, the method comprising:
detecting a parallel degree representing a parallelization ratio in parallel processing of the program by the plurality of execution units;
detecting a load associated with control of assigning the plurality of basic modules in the parallel processing of the program by the plurality of execution units, and
combining two or more basic modules which are successively executed according to the paralleled execution description in order to assign two or more basic modules as a module to a single execution unit, when a value of the parallel degree exceeds a predetermined value and a value of the load exceeds a predetermined value, the two or more basic modules being different from each other.

9. A computer-readable, non-transitory storage medium having stored thereon a program for causing an information processing apparatus which executes a program in parallel by a plurality of execution units, the program being divided into a plurality of basic modules executable asynchronously with another module and being defined a paralleled execution description for the plurality of basic modules, to function as:
a parallel degree detection module configured to detect a parallel degree representing a parallelization ratio in parallel processing of the program by the plurality of execution units;
a load detection module configured to detect a load associated with control of assigning the plurality of basic modules in the parallel processing of the program by the plurality of execution units; and
a module combination module configured to combine two or more basic modules which are successively executed according to the paralleled execution description in order to assign two or more basic modules as a module to a single execution unit, when a value of the parallel degree detected by the parallel degree detection module exceeds a predetermined value and a value of the load detected by the load detection module exceeds a predetermined value, the two or more basic modules being different one another.

* * * * *